(12) United States Patent
Lofstrom et al.

(10) Patent No.: US 11,046,460 B2
(45) Date of Patent: Jun. 29, 2021

(54) MACHINE HOLDING FIXTURE FOR MACHINING COMPOSITE LAMINATES ON A ROTOR BLADE

(71) Applicant: Sikorsky Aircraft Corporation, Stratford, CT (US)

(72) Inventors: Sven Roy Lofstrom, Irving, TX (US); David Littlejohn, Haslet, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 118 days.

(21) Appl. No.: 16/539,408

(22) Filed: Aug. 13, 2019

(65) Prior Publication Data

US 2019/0367187 A1 Dec. 5, 2019

Related U.S. Application Data

(62) Division of application No. 15/282,239, filed on Sep. 30, 2016, now Pat. No. 10,435,178.

(51) Int. Cl.
*B64F 5/10* (2017.01)
*B23Q 3/06* (2006.01)
*B32B 43/00* (2006.01)

(52) U.S. Cl.
CPC ............... *B64F 5/10* (2017.01); *B23Q 3/063* (2013.01); *B32B 43/003* (2013.01); *B32B 2603/00* (2013.01); *B32B 2605/18* (2013.01)

(58) Field of Classification Search
CPC ......... B64F 5/10; B23Q 3/063; B32B 43/003; B32B 2603/00; B32B 2605/18
See application file for complete search history.

(56) References Cited

U.S. PATENT DOCUMENTS

| 7,398,586 | B2 | 7/2008 | Prichard et al. |
| 8,322,700 | B2 | 12/2012 | Saberton et al. |
| 8,568,069 | B2 | 10/2013 | Brugman |
| 9,090,027 | B2 | 7/2015 | Sutton et al. |
| 2014/0260849 | A1 | 9/2014 | Johnson et al. |
| 2015/0354388 | A1 | 12/2015 | Cheah |
| 2018/0093782 | A1 | 4/2018 | Lofstrom et al. |

FOREIGN PATENT DOCUMENTS

| DE | 102007026100 B4 | 3/2013 |
| WO | 2016100081 A1 | 6/2016 |

*Primary Examiner* — Moshe Wilensky
(74) *Attorney, Agent, or Firm* — Foley & Lardner LLP

(57) ABSTRACT

A holding fixture includes a first blade support assembly and a second blade support assembly. The second blade support assembly is spaced at a distance from the first blade support assembly and includes a base plate removably mounted to a milling machine, an adjustable conic support connectable to the base plate via a spacer block, and a blade adjustment assembly movable to control a pressure applied by the blade adjustment assembly.

5 Claims, 11 Drawing Sheets

MACHINE HOLDING FIXTURE FOR MACHINING COMPOSITE LAMINATES ON A ROTOR BLADE

CROSS REFERENCE TO RELATED APPLICATIONS

This application is a Divisional of U.S. patent application Ser. No. 15/282,239 filed Sep. 30, 2016, which is incorporated herein by reference in its entirety.

BACKGROUND OF THE INVENTION

Exemplary embodiments of the invention relate to rotary-wing aircraft and, more particularly, to a bond fixture for use during the manufacture or repair of a rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the leading edge thereof, is selected to enhance rotor blade performance, for example to increase the hover and lift capabilities of the rotary-wing aircraft. Rotor blades are subjected to high stresses and strains resulting from aerodynamic forces developed during operation.

BRIEF DESCRIPTION OF THE INVENTION

According to one embodiment of the invention, a holding fixture includes a first blade support assembly and a second blade support assembly. The second blade support assembly is spaced at a distance from the first blade support assembly and includes a base plate removably mounted to a milling machine, an adjustable conic support connectable to the base plate via a spacer block, and a blade adjustment assembly movable to control a pressure applied by the blade adjustment assembly.

In addition to one or more of the features described above, or as an alternative, in further embodiments the conic support includes at least one pin receivable within a hollow interior of a blade spar of a rotor blade.

In addition to one or more of the features described above, or as an alternative, in further embodiments the conic support includes two pins receivable within the hollow interior of the blade spar.

In addition to one or more of the features described above, or as an alternative, in further embodiments the position of the pins may be adjusted to control a pressure applied by the pins to the blade spar to couple the conic support to the blade spar.

In addition to one or more of the features described above, or as an alternative, in further embodiments the holding fixture further comprises a contour support having a first support plate and a second support plate. The second support plate is movable between a closed position and an open position.

In addition to one or more of the features described above, or as an alternative, in further embodiments an interior surface of both the first support plate and the second support plate is complementary to a rotor blade such that when the second support plate is in the closed position, the first support plate and the second support plate are operable to apply a pressure to the rotor blade to restrict movement of the rotor blade relative to the first blade support assembly.

In addition to one or more of the features described above, or as an alternative, in further embodiments the second support plate is pivotally coupled to the first support plate.

In addition to one or more of the features described above, or as an alternative, in further embodiments the second support plate is detachably coupled to the first support plate.

In addition to one or more of the features described above, or as an alternative, in further embodiments the first blade support assembly includes a table and the contour support is mounted to an upper surface of the table.

In addition to one or more of the features described above, or as an alternative, in further embodiments the contour support is connected to an upper surface of the base plate.

According to another embodiment, a method of machining a laminate attached to a surface of a rotor blade includes providing a first assembly for supporting a first portion of the rotor blade and providing a second assembly for supporting a second portion of the rotor blade. The second assembly is spaced apart from the first assembly and includes a base plate. The base plate is coupled to a milling machine. A conic support is attached to a root end of the rotor blade. The conic support is mounted to the base plate. The rotor blade is positioned relative to the first assembly and the second assembly such that movement of the rotor blade is restricted and a first surface of the rotor blade including a first laminate is facing upwardly. The blade adjustment assembly is operated such that a block of the blade adjustment assembly is nested against an underside of the rotor blade. The first laminate is machined to remove a desired portion.

In addition to one or more of the features described above, or as an alternative, in further embodiments positioning the rotor blade relative to the first assembly and the second assembly includes enclosing the rotor blade within a first contour support associated with the first assembly and a second contour support associated with the second assembly.

In addition to one or more of the features described above, or as an alternative, in further embodiments attaching the conic support to the root end of the rotor blade includes inserting a plurality of support pins extending from the conic support into a blade spar of the rotor blade and adjusting the plurality of support pins to apply a pressure to opposite sides of the blade spar.

In addition to one or more of the features described above, or as an alternative, in further embodiments mounting the conic support to the base plate includes fastening the conic support to a spacer block extending from an upper surface of the base plate.

In addition to one or more of the features described above, or as an alternative, in further embodiments including removing the rotor blade from the holding fixture, repositioning the rotor blade relative to the first assembly and the second assembly such that movement of the rotor blade is restricted and a second surface of the rotor blade including a second laminate is facing upwardly, operating the blade adjustment assembly such that a block of the blade adjustment assembly is nested against an underside of the rotor blade, and machining the second laminate to remove a desired portion.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
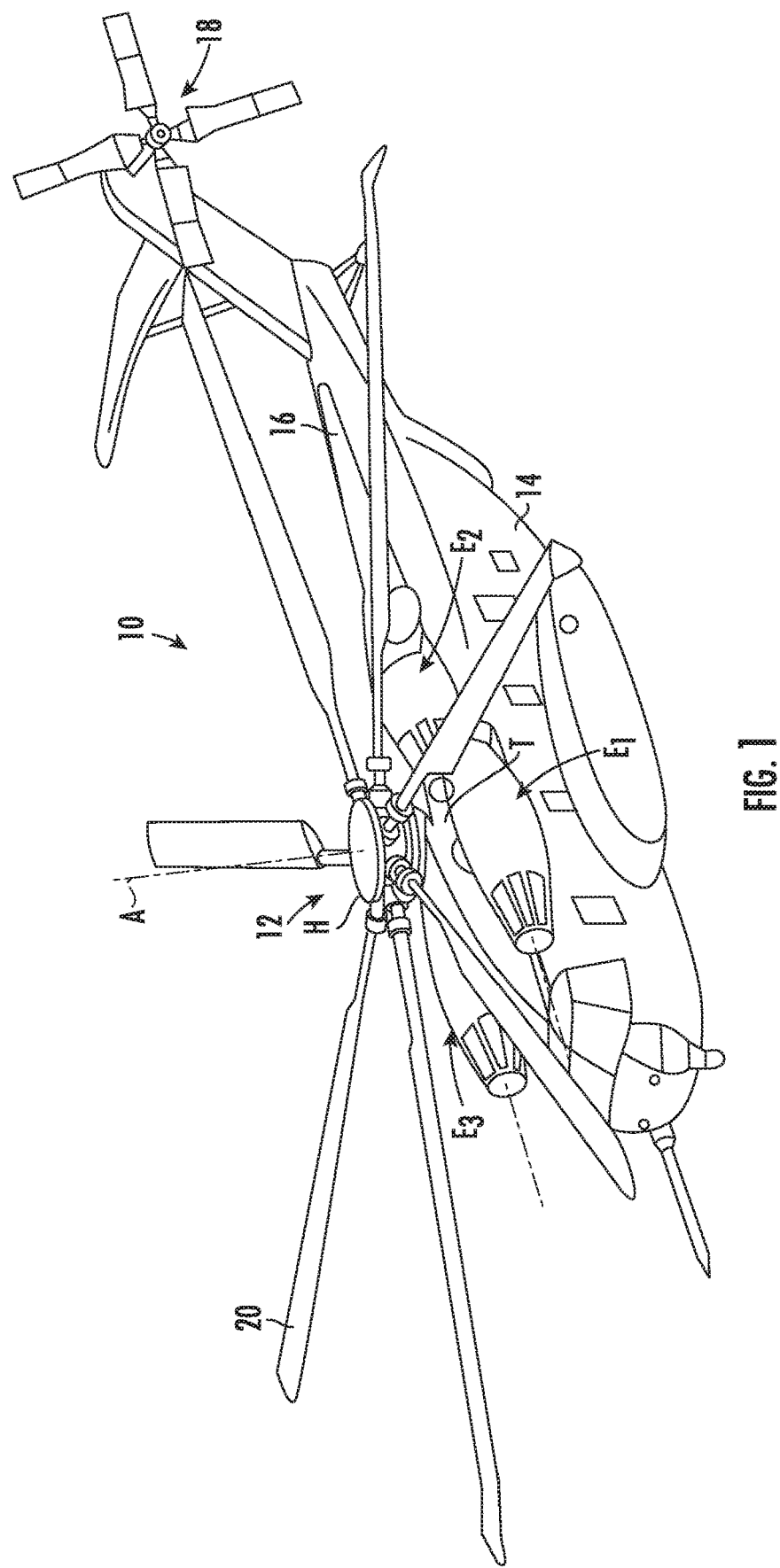
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
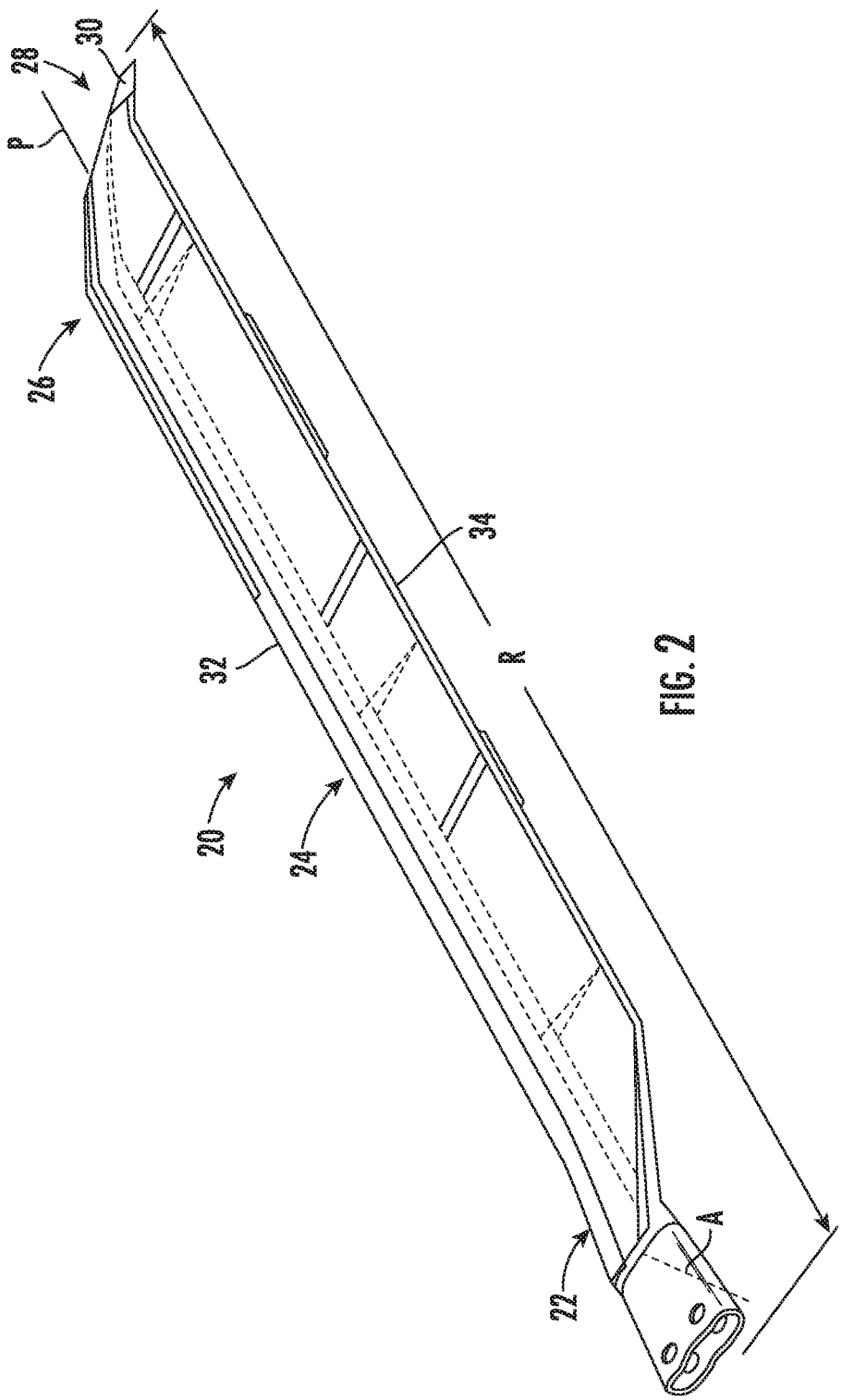
FIG. 2 is a perspective view of an example of a rotor blade of a rotary wing aircraft.
Figure 3:
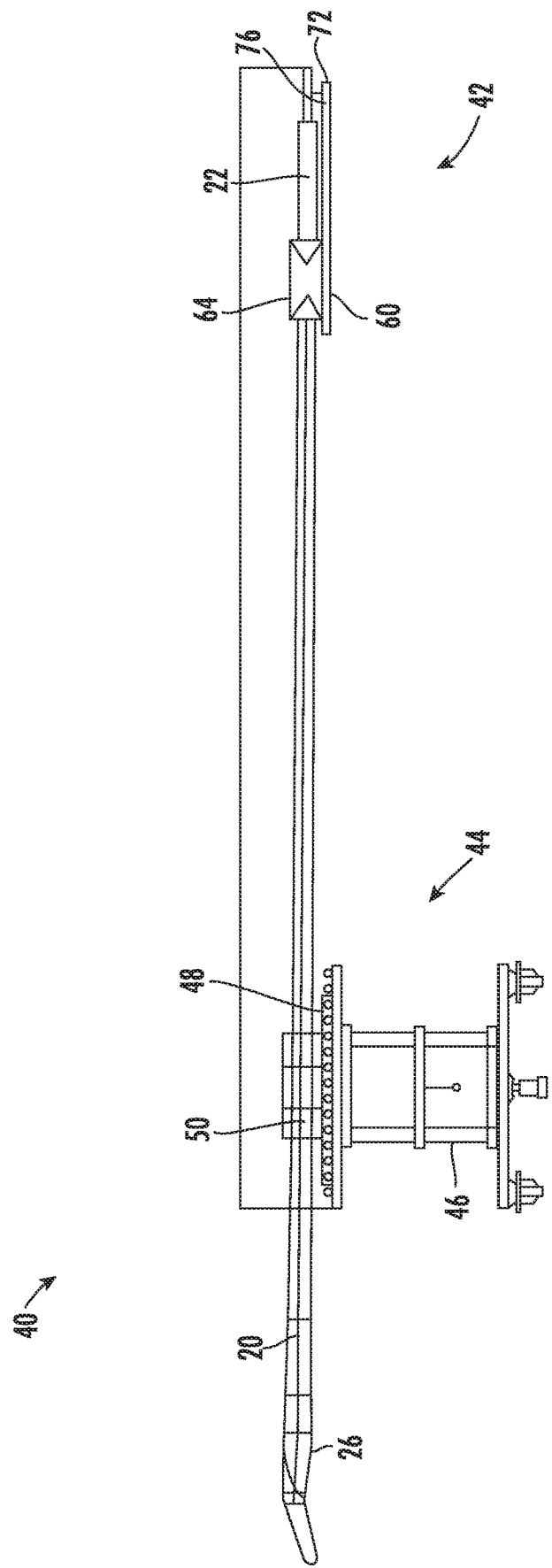
FIG. 3 is a perspective view of a holding fixture for supporting a rotor blade during a machining operation according to an embodiment.
Figure 4:
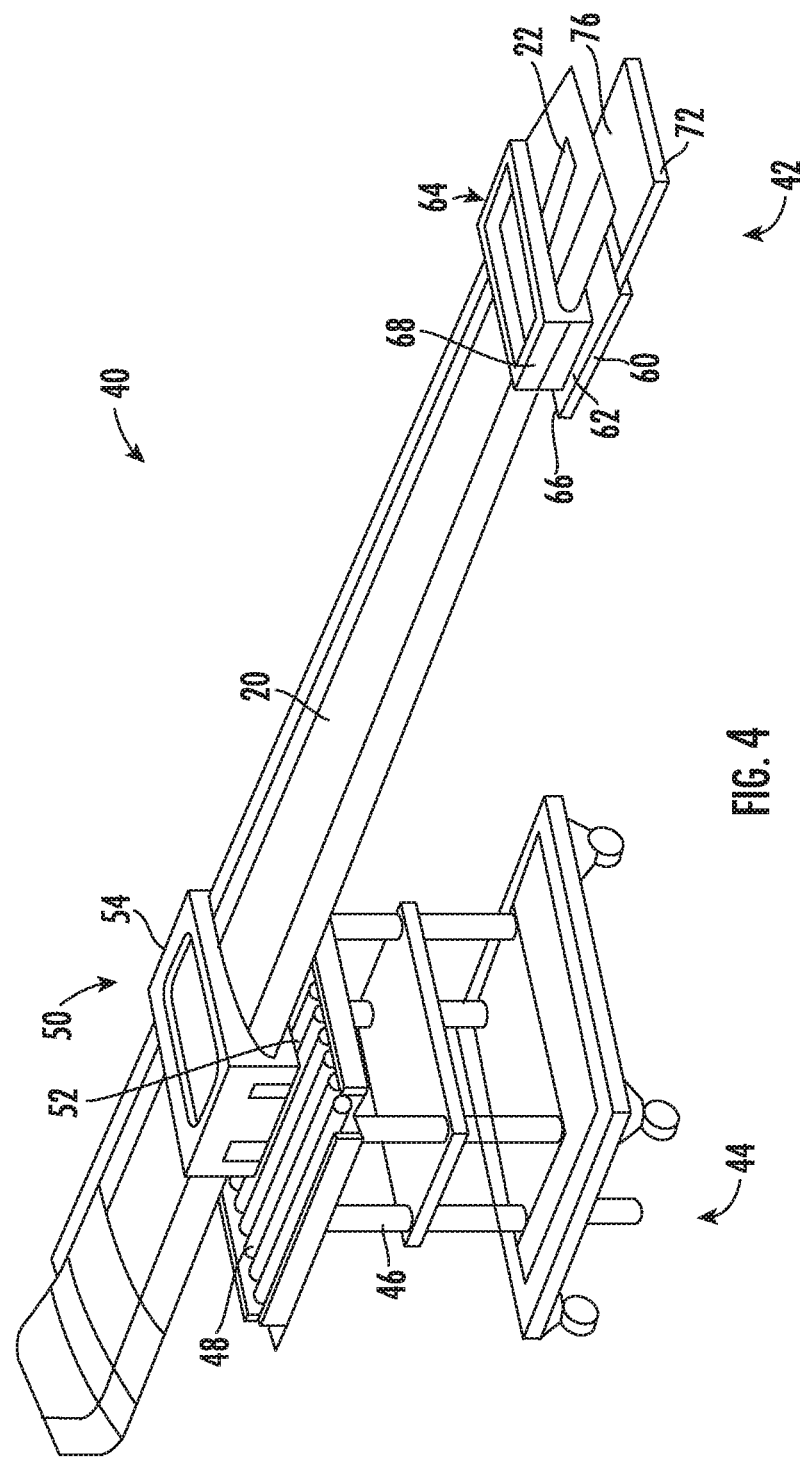
FIG. 4 is a side view of the holding fixture of FIG. 3 according to an embodiment.
Figure 5:
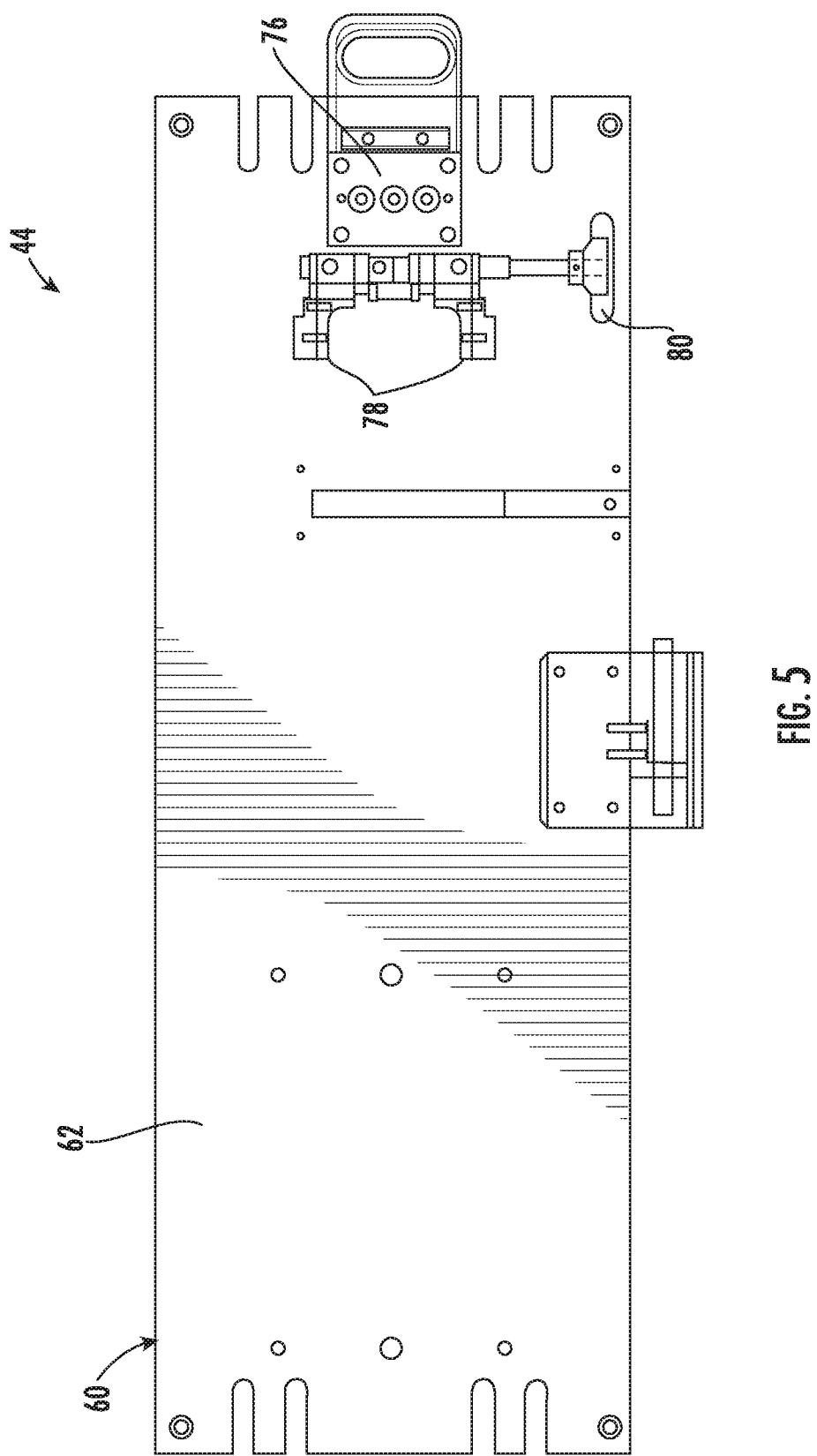
FIG. 5 is a top view of the second assembly of the holding fixture according to an embodiment.
Figure 6:
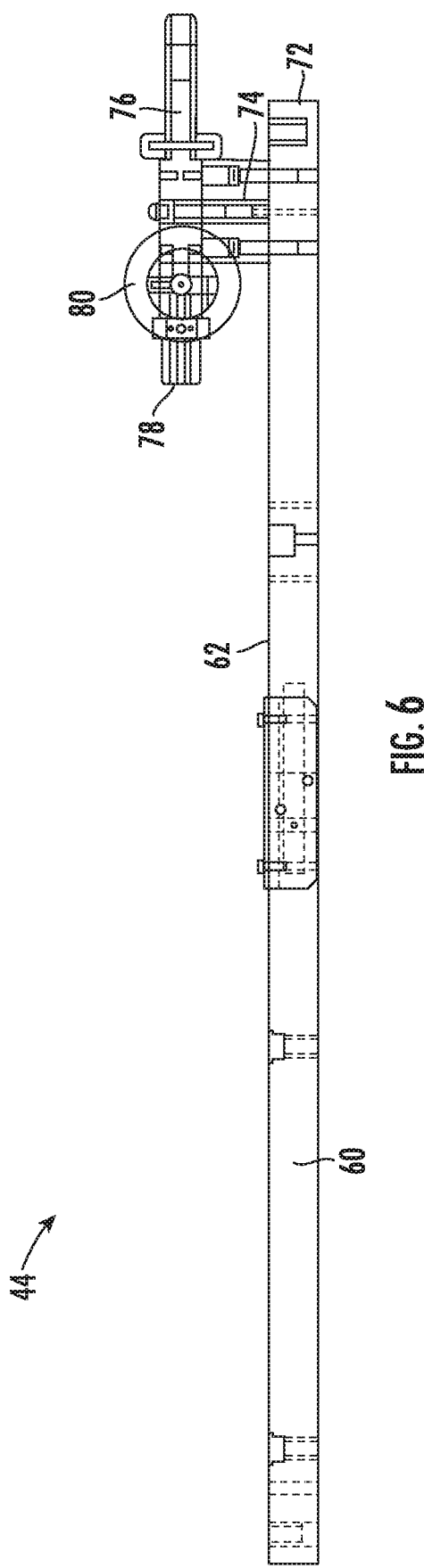
FIG. 6 is a side view of the second assembly of the holding fixture according to an embodiment.
Figure 7:
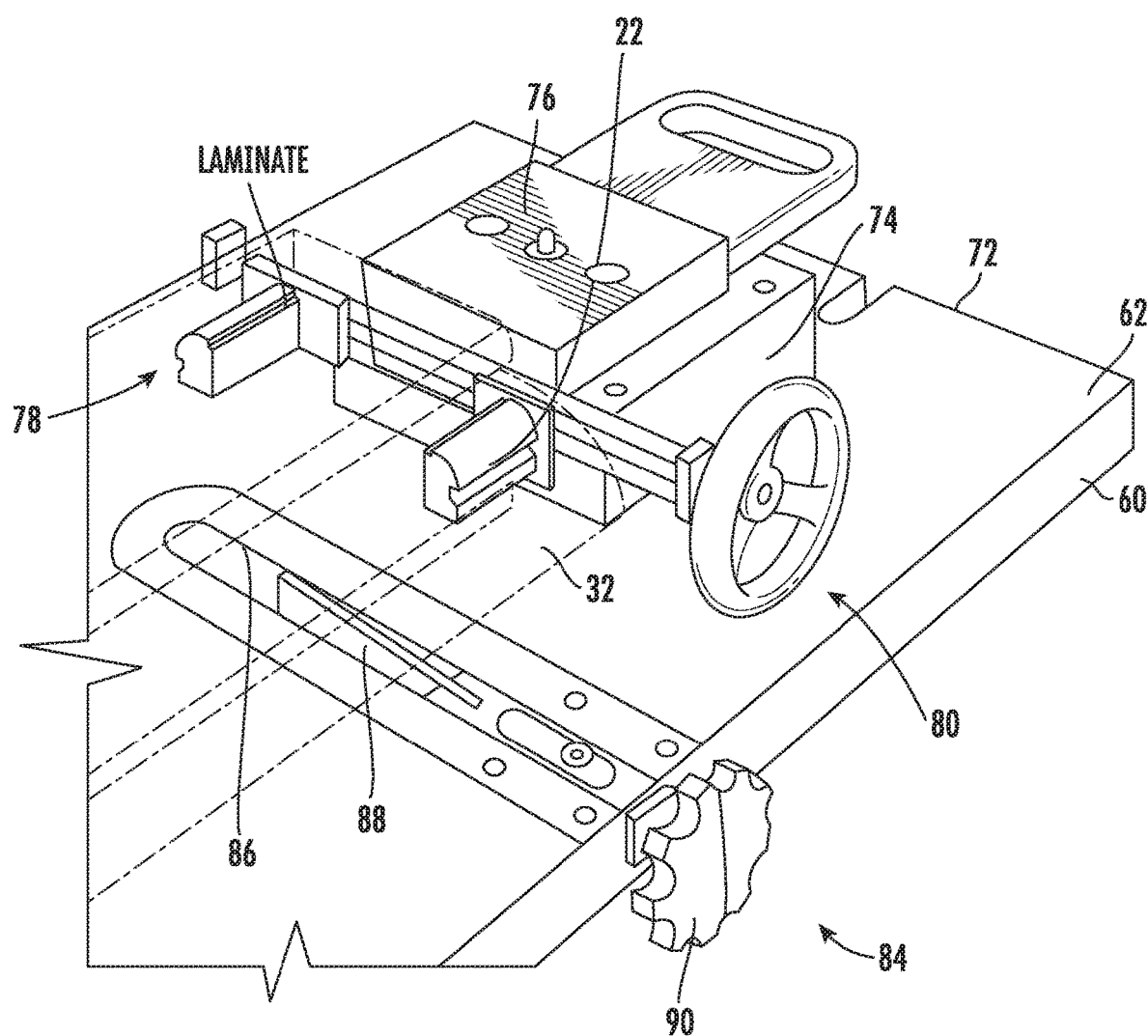
FIG. 7 is a perspective view of the root end of the rotor blade engaged with the second assembly of the holding fixture according to an embodiment.
Figure 8:
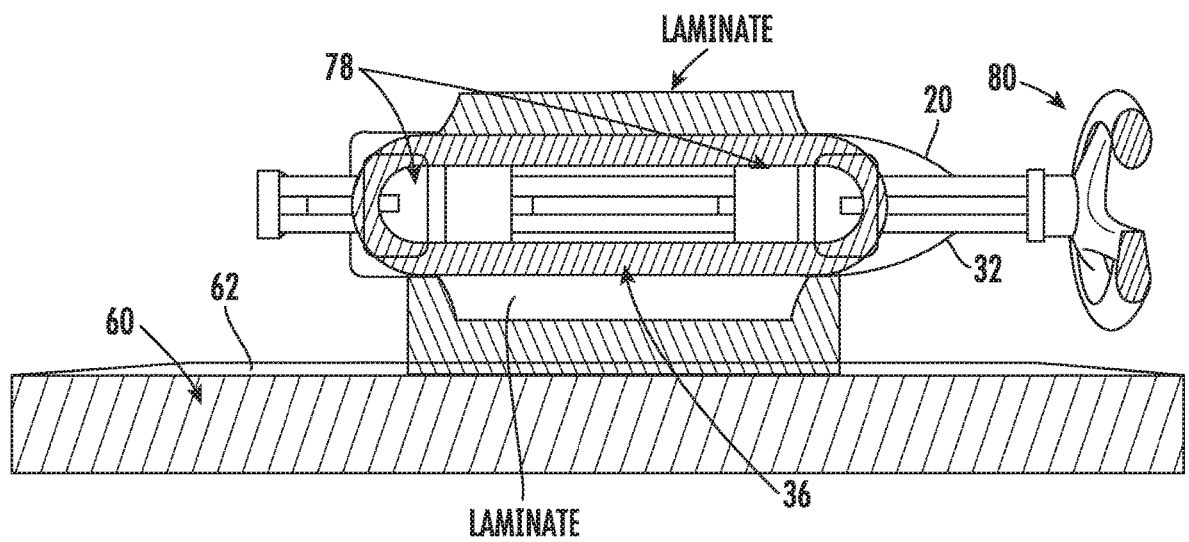
FIG. 8 is an end view of the root end of the rotor blade engaged with the second assembly of the holding fixture of FIG. 7 according to an embodiment.
Figure 9:
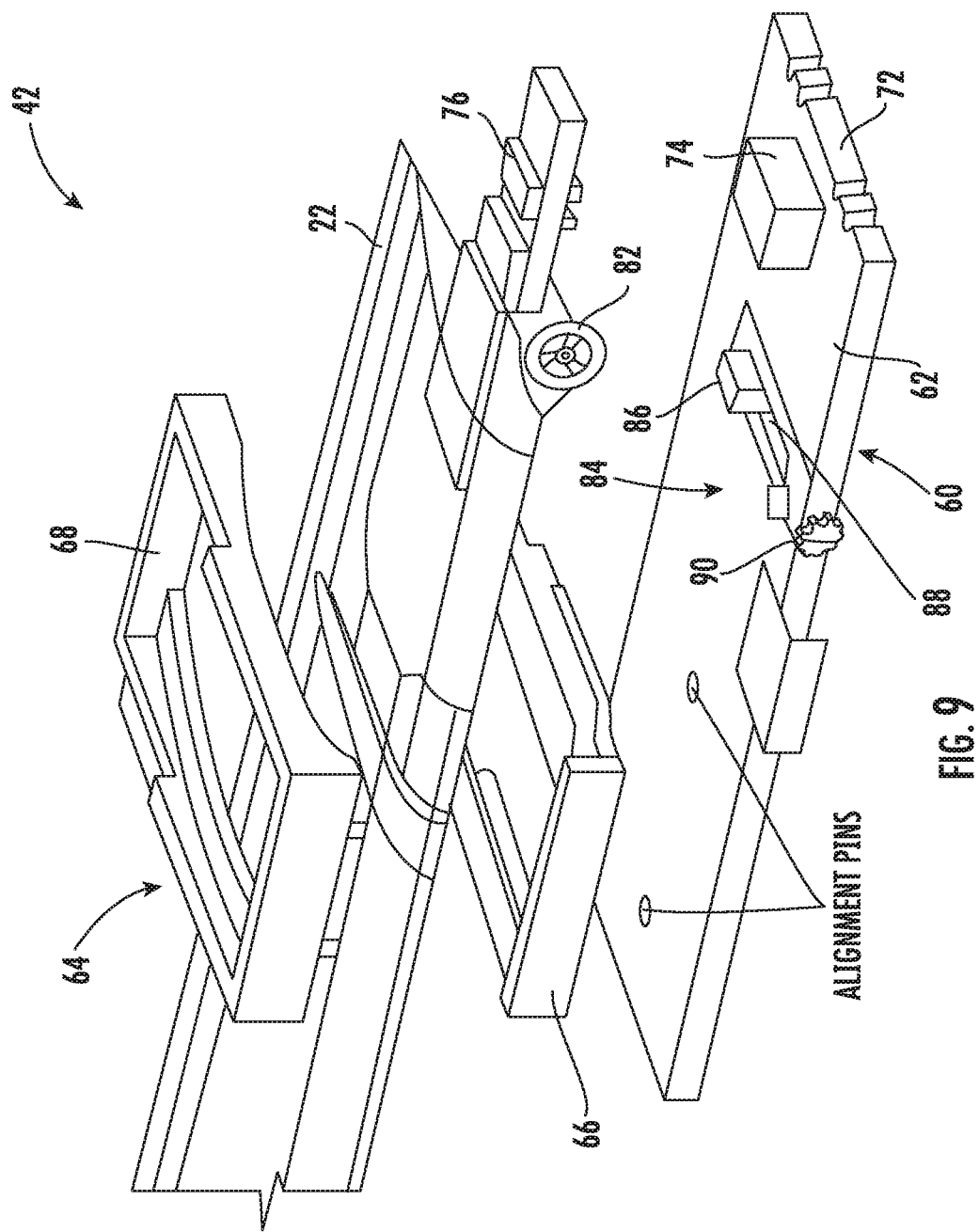
FIG. 9 is an exploded perspective view of the second contour support according to an embodiment.
Figure 10:
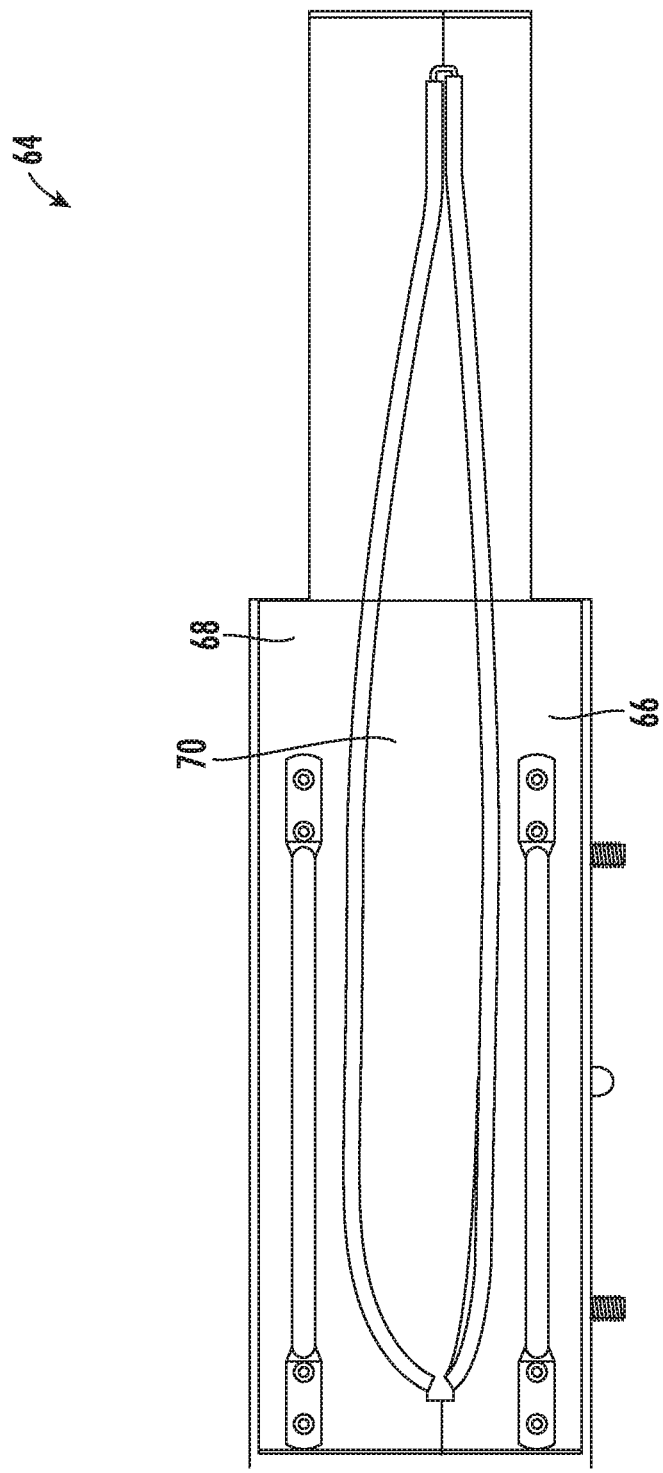
FIG. 10 is an end view of the second contour support according to an embodiment.

Referring to FIG. 2, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form (not shown); however, any angled or non-angled forms such as cathedral, gull, bent, and other non-straight forms are within the scope of the present invention. The anhedral form (not shown) as defined herein may include a rotor blade tip section 26 which extends at least partially out of a plane defined by the intermediate section 24.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34.

A holding fixture 40 for holding the rotor blade 20 in position during a milling operation is illustrated in FIGS. 3-10. The holding fixture 40 includes a first assembly 44 for supporting a central or outboard portion of the rotor blade 20 and a second assembly 42 for supporting the inboard end 22 of the rotor blade 20. The first assembly 44 includes a movable table 46 having a generally planar upper surface 48. A first contour support 50 mounted to the upper surface 48 of the movable table 46 includes a stacked first support plate 52 and a second support plate 54. In an embodiment, the first support plate 52 and the second support plate 54 are pivotally coupled adjacent a first end such that the second support plate 54 is movable relative to the first support plate 52 between an open position and a closed position. The inner surface of both the first support plate 52 and the second support plate 54 has a contour corresponding to an adjacent surface of the rotor blade 20. As a result, the rotor blade 20 is receivable within the contour support 50 when the second support plate 54 is in an open configuration. Further, when the second support plate 54 is in the closed position, the first contour support 50 applies a pressure to the surface of the rotor blade 20 to prevent movement thereof relative to both the contour support 50 and the table 46.

The second assembly 42 includes a base plate 60 adapted to mount, such as with one or more fasteners (not shown) to a corresponding surface of a milling machine (not shown). When the base plate 60 is coupled to the milling machine, an upper surface 62 of the base plate 60 may, but need not be substantially flush with the upper surface 48 of the table 46. The base plate 60 is spaced away from the leading edge of the table 46 by a predetermined distance associated with the rotor blade 20.

A second contour support 64 configured to mount to the upper surface 62 of the base plate 60 similarly includes a stacked first support plate 66 and a second support plate 68. In an embodiment, the first support plate 66 and the second support plate 68 are pivotally coupled adjacent a first end such that the second support plate 68 is movable relative to the first support plate 66 between an open position and a closed position. Alternatively, the second support plate 68 may detachably couple to the first support plate 66. The inner surface of the first and second support plates 66, 68 is contoured to match an adjacent surface of the rotor blade 20, near the root or inboard end. As a result, when the second support plate 68 is substantially aligned with the first support plate 66 to define a chamber 70 within which the rotor blade 20 is received (see FIG. 10), the second contour support 64 applies a pressure to the surface of the rotor blade 20 to prevent movement thereof relative to the contour support 64 and the base plate 60.

Located near the first end 72 of the base plate 60 is a block spacer 74 configured to cooperate with a conic support 76. When the conic support 76 is coupled to the spacer 74, the conic support 76 is substantially aligned with the blade spar 36 (FIG. 7) of the adjacent rotor blade 20. The conic support 76 includes at least one support pin 78 receivable with a hollow interior of the rotor blade spar 36. In the illustrated, non-limiting embodiment, the conic spar 76 includes two support pins 78. An adjustment assembly 80 associated with the two support pins 78 is operable to adjust the relative position of the two support pins 78. For example, the adjustment assembly 80 includes a wheel 82 that when rotated in a first direction moves the support pins 78 towards one another and when rotated in a second direction moves the support pins 78 away from one another. To couple the conic support 76 to the rotor blade 20, the support pins 78 are adjusted to apply a pressure to the opposing surfaces of the interior of the blade spar 36.

A blade adjustment assembly 84 is coupled to or integrally formed with the base plate 60. In an embodiment, the blade adjustment assembly 84 is positioned between the block spacer 74 and the second contour support 64. The blade adjustment assembly 84 is operable to adjust the height of a spacer 86 disposed between the base plate 60 and an adjacent surface of the rotor blade 20. The spacing provided by the blade adjustment assembly 84 is particularly important after a laminate located on a first side of the rotor blade 20 has been machined. The spacer 86 may be adjusted to compensate for the height of the laminate that was removed when the rotor blade 20 is repositioned within the fixture 40 for machining of a laminate located on a second opposite side of the rotor blade 20. In the illustrated, non-limiting embodiment, the blade adjustment assembly 84 includes a slidable block 86 engaged with a ramp 88. A knob 90 connected to the ramp 88 may be manipulated, such as pushed or pulled longitudinally or rotated for example, to adjust the slope of the ramp 88 and control the distance between the upper surface 62 of the base plate 60 and the upper surface of the block 86. It should be understood that the blade adjustment assembly 84 illustrated and described herein is intended as an example only, and that other assemblies configured to control the position of the rotor blade 20 relative to the upper surface 62 of the base plate 60 are also contemplated herein.

Figure 11:
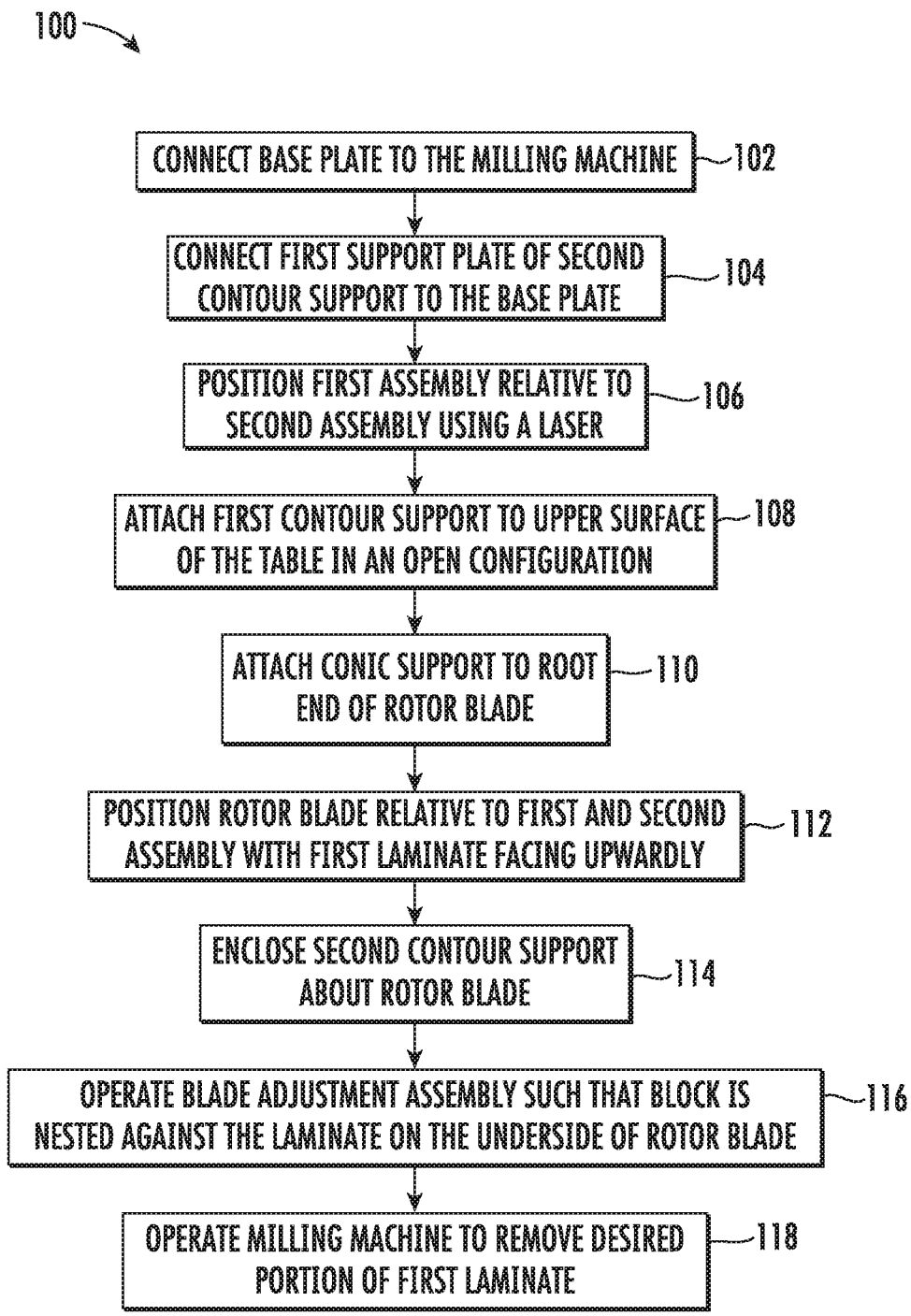
FIG. 11 is a method of machining a composite laminate of a rotor blade according to an embodiment.

With reference now to FIG. 11, a method of machining a composite laminate of a rotor blade 20 includes connecting the base plate 60 to the milling machine (not shown) at a desired position relative to the center line of the cutter, as shown in block 102. The first support plate 66 of the second contour support 64 is coupled to the upper surface 62 of the base plate 60 in block 104, and the first assembly 44 is positioned at a desired distance from the base plate 60 of the second assembly 42 and is aligned therewith using a laser, block 106. In block 108, the first contour support 50 is mounted to the upper surface 48 of the first assembly 44 and is oriented such that the second support plate 54 is in an open position relative to the first support plate 52. In block 110, the conic support 76 is installed into the root end 22 of the blade 20 and is tightened to ensure that the conic support 76 remains nested within the root end.

The rotor blade 20 is then positioned relative to the first assembly 44 and the second assembly 42 in block 112 such that a first side of the rotor blade 20 having a first laminate is facing upward. Positioning of the rotor blade 20 relative to first assembly 44 includes inserting the rotor blade 20 within the first support plate 52 of the first contour support 50 and rotating the second support plate 54 such that the rotor blade 20 is substantially enclosed by the first contour support. Similarly, positioning of the rotor blade 20 relative to the second assembly 42 includes positioning the conic support 76 onto the spacer block 74 and securing the conic support thereto. In block 114, the second support plate 68 of the second contour support 64 is coupled to the first support plate 66 and in block 116, the blade adjustment assembly 84 is operated until the block 86 is nested against the laminate located on the underside of the rotor blade 20, closest to the upper surface 62 of the base plate 60. In block 118, the milling machine (not shown) is then operated to remove a desired portion of the first laminate. The blade 20 may be removed from the holding fixture 40 via a reverse order and may be reinstalled following the same steps with the second side of the rotor blade 20 and the second laminate facing upward. When installing the blade 20 with the second side facing upward, after the first laminate has been machined, the position of the sliding block 86 of the blade adjustment assembly 84 will be in a different location due to the reduced thickness of the first laminate, and there is therefore the need for an increased spacer height.

The holding fixture 40 illustrated and described herein allows the rotor blade to be held stationary in a fixed location during both the manufacture of a new rotor blade 20 and the repair of an existing rotor blade 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of machining a laminate attached to a surface of a rotor blade comprising:
   providing a first assembly for supporting a first portion of the rotor blade;
   providing a second assembly for supporting a second portion of the rotor blade, the second assembly being spaced apart from the first assembly and including a base plate;
   coupling the base plate to a milling machine;
   attaching a conic support to a root end of the rotor blade;
   mounting the conic support to the base plate;
   positioning the rotor blade relative to the first assembly and the second assembly such that movement of the rotor blade is restricted and a first surface of the rotor blade including a first laminate is facing upwardly;
   operating a blade adjustment assembly such that a block of the blade adjustment assembly is nested against an underside of the rotor blade; and
   machining the first laminate to remove a desired portion.

2. The method according to claim 1, wherein positioning the rotor blade relative to the first assembly and the second assembly includes enclosing the rotor blade within a first contour support associated with the first assembly and a second contour support associated with the second assembly.

3. The method according to claim 1, wherein attaching the conic support to the root end of the rotor blade includes inserting a plurality of support pins extending from the conic support into a blade spar of the rotor blade and adjusting the plurality of support pins to apply a pressure to opposite sides of the blade spar.

4. The method according to claim 1, wherein mounting the conic support to the base plate includes fastening the conic support to a spacer block extending from an upper surface of the base plate.

5. The method according to claim 1, further comprising:
   removing the rotor blade from the holding fixture;
   repositioning the rotor blade relative to the first assembly and the second assembly such that movement of the rotor blade is restricted and a second surface of the rotor blade including a second laminate is facing upwardly;

operating the blade adjustment assembly such that a block of the blade adjustment assembly is nested against an underside of the rotor blade; and machining the second laminate to remove a desired portion.

* * * * *